US011631315B1

(12) United States Patent
Menchaca et al.

(10) Patent No.: US 11,631,315 B1
(45) Date of Patent: Apr. 18, 2023

(54) ALARM SYSTEM FOR UNATTENDED VEHICLE OCCUPANTS

(71) Applicants: Martin Menchaca, Tyler, TX (US);
Camille Tipple, Tyler, TX (US)

(72) Inventors: Martin Menchaca, Tyler, TX (US);
Camille Tipple, Tyler, TX (US)

(*) Notice: Subject to any disclaimer, the term of this patent is extended or adjusted under 35 U.S.C. 154(b) by 0 days.

(21) Appl. No.: 17/579,361

(22) Filed: Jan. 19, 2022

(51) Int. Cl.
*G08B 21/22* (2006.01)
*G08B 21/24* (2006.01)
*B60R 22/48* (2006.01)
*H04W 4/90* (2018.01)
*G08B 3/10* (2006.01)

(52) U.S. Cl.
CPC .............. *G08B 21/22* (2013.01); *B60R 22/48* (2013.01); *G08B 3/10* (2013.01); *G08B 21/24* (2013.01); *H04W 4/90* (2018.02); *B60R 2022/4816* (2013.01)

(58) Field of Classification Search
CPC .......... G08B 21/22; G08B 3/10; G08B 21/24; B60R 22/48; B60R 2022/4816; H04W 4/90
See application file for complete search history.

(56) References Cited

U.S. PATENT DOCUMENTS

| 9,539,983 B2 | 1/2017 | Demeritte | |
| 10,134,258 B2 | 11/2018 | Chacon, Jr. et al. | |
| 2009/0265057 A1* | 10/2009 | Chinnadurai | G07C 5/085 701/31.4 |
| 2017/0021800 A1* | 1/2017 | Seibert | B60R 22/105 |

* cited by examiner

*Primary Examiner* — Brian Wilson
(74) *Attorney, Agent, or Firm* — Sanchelima & Associates, P.A.; Christian Sanchelima; Jesus Sanchelima

(57) ABSTRACT

An alarm system for unattended vehicle including housing assembly and electrical assembly. Vehicle assembly includes seats, seatbelts, motor and dashboards. Housing assembly includes a housing mounted underneath dashboard. Electrical assembly includes seat sensor emitting signal if one of the seatbelts is engaged after motor is turned off. The signal triggers a timer and an alarm. The alarm sounds a speaker mounted to housing. If timer is lapsed a second signal sends an alert message to emergency services to warn that people are inside of vehicle preventing people from being damaged by heat.

7 Claims, 3 Drawing Sheets

ALARM SYSTEM FOR UNATTENDED VEHICLE OCCUPANTS

BACKGROUND OF THE INVENTION

1. Field of the Invention

The present invention relates to an alarm system and, more particularly, to an alarm system for unattended vehicle occupants that triggers an alarm if at least one seatbelt is engaged after the vehicle has been turned off.

2. Description of the Related Art

Several designs for alarm systems have been designed in the past. None of them, however, include an alarm system for unattended vehicle occupants that includes a plurality of seatbelt sensors that detect the status of each seatbelt.

Applicant believes that a related reference corresponds to U.S. Pat. No. 10,134,258 issued for a temperature alert system for a motor vehicle that includes a sensor that can be integrated into seat belt or buckle and the system can sound an alarm or the horn. Applicant believes that another related reference corresponds to U.S. Pat. No. 9,539,983 issued for a vehicle seatbelt attachment device that sounds an alert as a reminder not to forget a child in the vehicle. None of these references, however, teach of an alarm system for unattended vehicle occupants that sounds an alarm if a seatbelt is still engaged after the vehicle has been turned off and contact emergency services if another time period expires.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an alarm system for unattended vehicle occupants that detects the status of each seatbelt of a vehicle.

It is another object of this invention to provide an alarm system for unattended vehicle occupants that activates an alarm after a first predetermined time lapses after the motor turns off and a seatbelt is still engaged.

It is still another object of the present invention to provide an alarm system for unattended vehicle occupants that contacts emergency services if a second predetermined time lapses after the motor turns off, so authorities can be alerted and save lives.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a side see through view of the housing assembly 20 showing a microcontroller 46, a communication unit 47, a battery 42 and a timer 48 embedded inside housing 22. The battery is connected to the cord 42a.

FIG. 4 is a representation of an enlarged see-through view of the seat belt 68 showing sensor 45 embedded within first fastener 68a.

DETAILED DESCRIPTION OF THE EMBODIMENTS OF THE INVENTION

Figure 1:
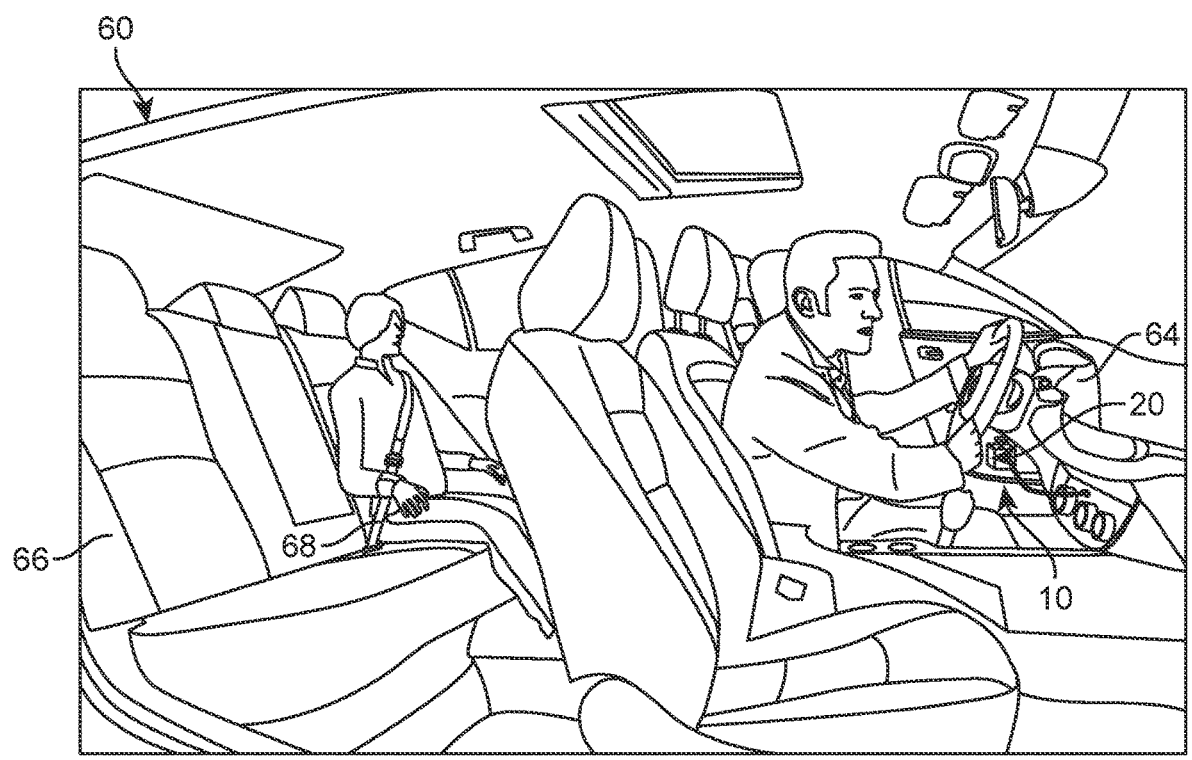
FIG. 1 represents an isometric operational view of the present invention 10. Showing the housing assembly 20 mounted underneath the dashboard 64.
Figure 2:
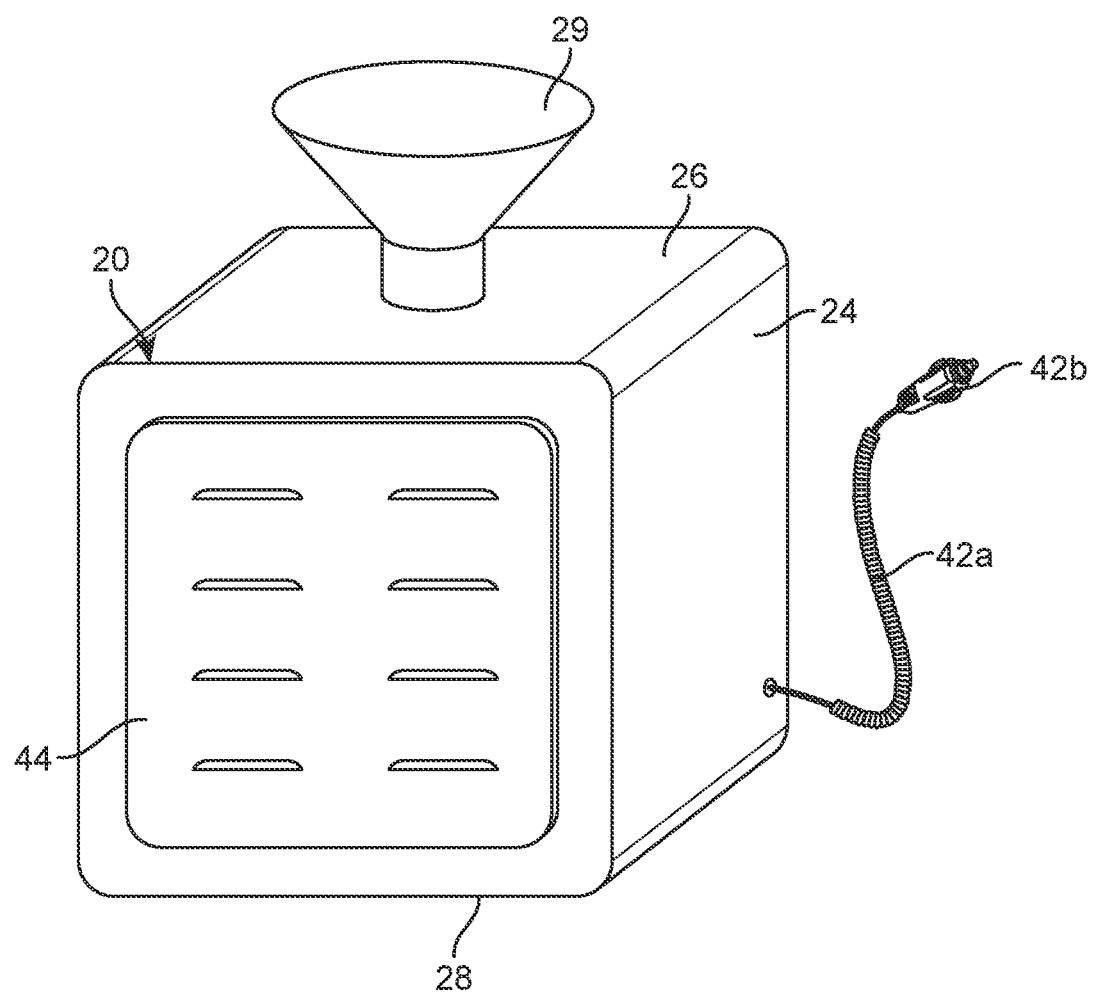
FIG. 2 shows an isometric view of housing assembly 20 showing attaching member 29.

Referring now to the drawings, where the present invention is generally referred to with numeral 10, it can be observed that it basically includes a housing assembly 20, an electrical assembly 40 and a vehicle assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Vehicle assembly 60 includes vehicle 62. Vehicle 62 may be a sedan, a coupe, a bus, a truck, a station wagon, a hatchback, a convertible, a sport-utility vehicle, a minivan, a pickup truck, a hybrid car, an electric car, a bus, a combustion engine car or any kind of vehicle with rear seats. Vehicle 62 may have a dashboard 64, rear seats 66 and seatbelts 68. In a preferred embodiment, first fastener 68a may be a socket buckle and second fastener 68b may be a plug buckle. Second fastener 68b may be attached to a second strap 68d using stitches, tethering, rivets, bolts, snaps, or any other suitable attaching method. Second strap 68d may be adjustable. Second strap 68d may be made of fabric, polyester, nylon, or any other suitable material. First fastener 68a may be attached to a first strap 68c using stitches, tethering, rivets, bolts, snaps, or any other suitable attaching method. First strap 68c may be made of fabric, polyester, nylon or any other suitable material. The seatbelts 68 may be located on the of rear seats for securing a user. It should be understood that the seatbelts 68 may be a lap belt, a shoulder belt, a three-point belt, a five-point belt, or any other kind of vehicle seat belt known in the prior art.

Housing assembly 20 includes housing 22. Housing 22 may include sidewalls 24, top wall 26 and bottom wall 28. In one embodiment each of the sidewalls 24 may have a rectangular shape. It also may be suitable to have sidewalls 24 with oval shape, triangular shape, circular shape, polygonal shape, irregular shape, elliptical shape, or any other shape. Top wall 26 may have a rectangular shape, a circular shape, a triangular shape, a polygonal shape, an oval shape, an elliptical shape or any other shape. Bottom wall 28 may have a rectangular shape, a circular shape, a triangular shape or any other shape. Each of sidewalls 24 may have same shape and same size. It also may be suitable to have sidewalls with different size and shapes. Sidewalls 24, top wall 26 and bottom wall 28 may define a housing 22 with a cuboid shape. Housing 22 may have rounded edges. Housing 22 may be made of polystyrene, polypropylene, aluminum, carbon fibers, wood, or any other rigid material. Housing 22 may have a protective coating. Housing 22 may be heat resistant.

Housing assembly 20 may further include attaching member 29. In one embodiment attaching member 29 may be located on top wall 26 of housing 22. Attaching member 29 may be a suction cup, bolts, threaded end, snaps, straps, magnets, or any other variation thereof. Attaching member 29 may be permanent attaching member 29 for permanently attaching the housing 22 to the dashboard 64 or a removably attaching member 29 for removably attaching the housing 22 to the dashboard 64.

Electrical assembly 40 may include battery 42, cord 42a, speaker 44, sensor 45, microcontroller, 46, communication unit 47 and timer 48. In a preferred embodiment, battery 42 is a rechargeable battery. Battery 42 may be connected to the cord 42a. Cord 42a may include plug 42b at one distal end. Plug 42b may be a car plug to be connected to a car socket. Battery 42 may be charged by the car battery via the cord 42a and the plug 42b. Battery 42 may be contained within housing 22. Battery 42 may supply electrical energy to electrical assembly 40. Speaker 44 may be mounted on one of the sidewalls 24. Electrical assembly 40 may include multiple speakers on multiple sidewalls 24. Microcontroller 46, timer 48 and communication unit 47 may be embedded within housing 22. Microcontroller 46 may be an ARM microcontroller, a FPGA, a microprocessor, or any kind of microcontroller known in the prior art. Timer 48 may be an electromechanical timer, an electronic timer or a mechanic timer. Timer 48 may have quartz clocks or digital counters. Communication unit 47 may be configured to be in wireless communication with emergency services and emergency contacts.

In a preferred embodiment, sensor 45 may be embedded within first fastener 48a to detect whether the second fastener 48b is engaged to first fastener 48a or not, thereby detecting if a user is sat on at least one of rear seats 66. Sensor 45 may be a limit switch sensor, an optic sensor, a piezoelectric sensor, or any other suitable kind of sensor known in the prior art. It also may be suitable to have sensor 45 on rear seat 66 detecting weight or touch of user and thereby detecting user. It also may be suitable to have optical sensors, cameras or the like to detect presence of a user sat on the one of the rear seats 66. Sensor 45 may further detect if engine of vehicle 62 is switched on or off.

Figure 3:
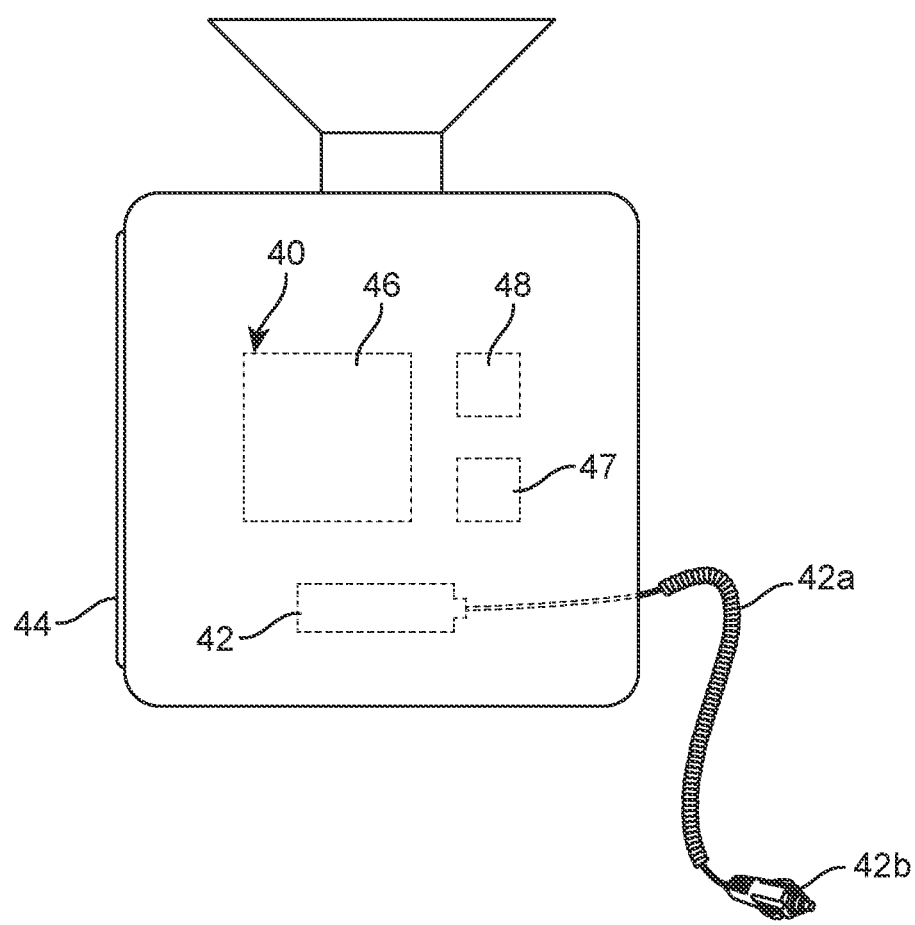
Figure 4:
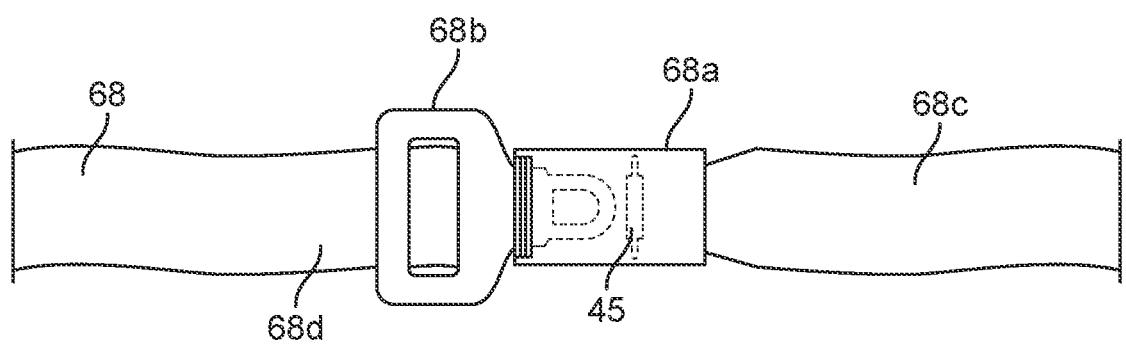

Referring now to FIGS. 1, 3 and 4. Sensor 45 may detect if user is still sat on the one of the rear seats 66 after motor engine is switched off. Sensor 45 may detect if motor is turned off by detecting vibrations, connecting sensor 45 to engine switch or any other suitable method known in the prior art for detecting if motor is turned off. Sensor 45 may emit a first signal to activate timer 48 with a first predetermined time. Microcontroller 46 may detect if first predetermined time is lapsed to activate speaker 44 to emit an alarm alerting that user is still sat on the at least one rear seat 66. Microcontroller 46 may also activate timer 48 with a second predetermined time when first predetermined time is lapsed. Microcontroller 46 may detect if second predetermined time is lapsed to send an alert message via communication unit 47 to alert emergency services and emergency contacts of a user sat on the at least rear seat.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An alarm system for unattended vehicle occupants, comprising:
    A) a vehicle assembly including a dashboard, seats, seatbelts and a motor;
    B) a housing assembly including a housing and an attaching member, wherein said housing has a cuboid shape with rounded corners, said housing has a protective coating, wherein said attaching member is used to mount said housing underneath said dashboard, said attaching member fixed to a top end of said housing, said attaching member has a conical shape; and
    C) an electrical assembly including a cord, a battery, a microcontroller, a communication unit and a timer, and a plurality of sensors to detect if at least one of the seatbelts is engaged and the motor is turned off emitting a first alarm after a first predetermined time and contacting emergency services after a second predetermined time, wherein said battery provides electrical energy to said electrical assembly, wherein the battery is configured to be recharged by a car battery via the cord, wherein said communication unit is wireless with emergency service and emergency contacts, wherein said first predetermined time is activated by means of said plurality of sensors when detecting at least one of the seatbelts is engaged and the motor is turned off, and said second predetermined time is activated when the first predetermined time has elapsed, wherein said microcontroller sends alert message to the emergency services and the emergency contacts via the communication unit after said second predetermined time, wherein said communication unit, said microcontroller and said timer are within said housing, wherein said plurality of sensors are within said seatbelts.

2. The alarm system for unattended vehicle occupants of claim 1, wherein each of the seatbelts include a first fastener and a second fastener.

3. The alarm system for unattended vehicle occupants of claim 2, wherein said first fastener is a socket buckle, wherein said second fastener is a plug buckle.

4. The alarm system for unattended vehicle occupants of claim 3, wherein at least one sensor of said plurality of sensors is embedded within said socket buckle detecting if plug buckle is engaged to socket buckle.

5. The alarm system for unattended vehicle occupants of claim 1, wherein said electrical assembly further includes a speaker to sound the first alarm.

6. The alarm system for unattended vehicle occupants of claim 5, wherein said speaker is located on the housing.

7. An alarm system for unattended vehicle occupants, consisting of:
    A) a vehicle assembly including a dashboard, seats, seatbelts and a motor, each of the seats includes one of the seatbelts;
    B) a housing assembly including a housing having a plurality of sidewalls, a top wall and a bottom wall, said housing assembly further includes one attaching member to mount said housing to underneath said dashboard, said attaching member is a suction cup, each of the seatbelts include a plug buckle and a socket buckle; and
    C) an electrical assembly including a first sensor, a second sensor, a third sensor, a microcontroller, a communication unit and a timer, wherein said communication unit is wireless with emergency service and emergency contacts, wherein said first sensor is embedded within said socket buckle to detect if at least one of the seatbelts is engaged, said second sensor is connected to an engine switch of said motor and said third sensor is within said vehicle assembly, said third sensor is configured to detect presence of a user in said seats, wherein said first sensor, said second sensor and said third sensor are configured to emit a first alarm after a first predetermined time and contacting said emergency service and emergency contacts after a second predetermined time, the electrical assembly further includes a battery and a speaker, said battery provides electrical energy to the electrical assembly, said speaker sounds the first alarm, said battery is configured to be recharged by a car battery, wherein said first predetermined time is configured to be activated in said timer by means of said first sensor, said second sensor and said third sensor when detecting that at least one of the seatbelts is engaged, the presence of the user is detected and the motor is turned off, and said second predetermined time is activated when the first predetermined time has elapsed.

\* \* \* \* \*